US007360501B2

(12) United States Patent
Jacobsen

(10) Patent No.: US 7,360,501 B2
(45) Date of Patent: Apr. 22, 2008

(54) DEVICE FOR ADMINISTRATION OF FLUIDS

(75) Inventor: Henrik Jacobsen, Copenhagen (DK)

(73) Assignee: TraceCompany Aps (DK)

( * ) Notice: Subject to any disclaimer, the term of this patent is extended or adjusted under 35 U.S.C. 154(b) by 271 days.

(21) Appl. No.: 10/524,708

(22) PCT Filed: Aug. 11, 2003

(86) PCT No.: PCT/DK03/00533

§ 371 (c)(1),
(2), (4) Date: May 12, 2005

(87) PCT Pub. No.: WO2004/014461

PCT Pub. Date: Feb. 19, 2004

(65) Prior Publication Data

US 2005/0224004 A1 Oct. 13, 2005

(30) Foreign Application Priority Data

Aug. 12, 2002 (DK) .............................. 2002 01202

(51) Int. Cl.
*A01K 7/00* (2006.01)

(52) U.S. Cl. ..................... 119/72; 119/72.5; 224/148.2; 222/175

(58) Field of Classification Search .................. 119/72, 119/712, 72.5; 604/79; 224/148.2, 148.4, 224/148.5, 148.6, 576, 577; 222/175
See application file for complete search history.

(56) References Cited

U.S. PATENT DOCUMENTS 3,774,608 A 11/1973 Wohler, Jr. ................. 128/223
4,050,460 A 9/1977 Magrath ..................... 128/223
4,526,298 A * 7/1985 Boxer et al. ................ 222/130
4,544,087 A * 10/1985 Modig ..................... 224/148.2
4,773,898 A 9/1988 Begouen ...................... 604/79
4,848,660 A * 7/1989 O'Connell .................. 239/154
5,059,182 A * 10/1991 Laing ........................ 604/142
5,154,324 A * 10/1992 Stratford ..................... 222/175
5,156,593 A 10/1992 Green ......................... 604/77
5,188,266 A * 2/1993 Loulias .................... 224/148.6
5,188,610 A 2/1993 Rains ......................... 604/183
5,400,934 A * 3/1995 Ducros .................... 224/148.2
5,566,645 A * 10/1996 Cole .......................... 119/712
5,622,056 A * 4/1997 Utter ........................... 62/121
5,967,415 A * 10/1999 Utter .......................... 239/152
6,071,264 A * 6/2000 Castor ........................ 604/183

(Continued)

FOREIGN PATENT DOCUMENTS

DK 20018682 2/2000

(Continued)

*Primary Examiner*—Yvonne R. Abbott
(74) *Attorney, Agent, or Firm*—Gifford Krass Sprinkle Anderson & Citkowski

(57) ABSTRACT

The present invention comprises a device for oral administration of a fluid source, preferably administration to an individual in need thereof, and methods for use of said device. In one embodiment of the invention, the device is used to administer colostrum to newborn calves, on order to generate higher levels of passive immunity in the calves than may be gained either from natural suckling or bottle feeding of colostrum. The fluid or liquid source according to the invention is preferably selected from the group consisting of milk, artificial milk substitutes, and colostrum. Liquid obtained from a domestic animal, including a bovine species.

19 Claims, 10 Drawing Sheets

U.S. PATENT DOCUMENTS

| | | | | |
|---|---|---|---|---|
| 6,241,575 | B1 * | 6/2001 | Shailer | 450/38 |
| 6,247,619 | B1 * | 6/2001 | Gill et al. | 222/105 |
| 6,364,170 | B1 * | 4/2002 | Anderson et al. | 222/321.7 |
| 6,669,064 | B2 * | 12/2003 | Perricone | 224/148.6 |
| 6,723,076 | B1 * | 4/2004 | Strobel | 604/262 |
| 6,729,265 | B2 * | 5/2004 | Confer et al. | 119/174 |
| 6,837,026 | B2 * | 1/2005 | Setton | 53/412 |
| 7,201,299 | B2 * | 4/2007 | Forsman | 224/148.2 |

FOREIGN PATENT DOCUMENTS

| | | |
|---|---|---|
| GB | 607592 | 1/1945 |
| GB | 624155 | 7/1947 |
| GB | 727959 | 12/1953 |
| GB | 2150814 | 10/1984 |
| GB | 2234484 | 4/1990 |
| GB | 2315522 | 7/1996 |
| GB | 2359000 | 8/2001 |

* cited by examiner

DEVICE FOR ADMINISTRATION OF FLUIDS

FIELD OF INVENTION

The present invention relates to devices for oral administration of fluids, preferably an administration to individuals including animals in need thereof. The invention also relates to methods for administration and to the use of said devices in such methods. More specifically, the present invention relates to devices for orally administering fluids to domestic animals. The present invention in one interesting embodiment relates to devices for orally administering colostrum to new-born calves.

BACKGROUND OF INVENTION

The Importance of Feeding Newborn Calves Colostrum

It is known that the transfer of immunoglobulin across the placenta to the developing bovine foetus is minimal, so bovine neonates are born essentially agammaglobulinemic (Brambel, F. W. R. (1970), p 201-365 in Frontiers in Biology. Vol. 18, A. Neuberger and E. L. Tatum, ed. North Holland Publ. Co., Amsterdam, The Netherlands; Kruse, V (1970). Anim. Prod. 12:619-626). Given this fact, it is vital that newborn calves can acquire passive immunity from the immunoglobulin contained in the colostrum of the dam. Certainly, Penhale et al have concluded that the most important factor in resistance to infections at this early stage in the calf's life is its level of IgG (Penhale et al., (1970) Br. Vet. J. 126:30-37), and Rea et al have reported that a mortality risk is associated with calves with IgG concentrations of less than 5 g/L. (Rea et al., (1996) JAVMA. 28:2047-2049). Certainly, calf mortality is a significant economic problem to the farming industries, with high mortality rates within the first week after birth (Wells et al., (1996) Prev. Vet. Med 29:9-19).

It has also been demonstrated that the feeding of colostrum to newborn calves is associated with more efficient weight increases of the calves. Pedersen et al. (2000) have examined populations of calves fed either colostrum or milk replacer and observed that those calves receiving colostrum at birth gained weight in the first week after birth, compared to calves on milk replacer which lost weight during the same period (Pedersen et al., (2000), J. Dairy Sci 83:2829-2833). Pedersen et al postulate that this difference could have been caused by either the high nutrient density in the colostrum and/or by the enhancing of the calves' immune device by the calves acquiring immunoglobulin from the colostrum. Certainly, the calves fed colostrum had a higher plasma immunoglobulin concentration after 24 and 48 hours than those fed milk replacer.

Advantages of using an esophageal feeder to deliver colostrum to newborn calves Passive immunization of calves is most efficient immediately after birth, and ceases by about 24 hours after birth (Deutsch et al., (1983) in Veterinary medicine, $6^{th}$ ed. 11907-1296, pub. Bailiere Tindall, London), thus it is important for the calf to receive enough colostrum within this short time. However, suckling calves often consume only small amounts of colostrum (Gay (1983) Proc. Fourth Int. Symp. Neonatal Diarrhea. Unir. Saskatchewan. 346-364), and although monitoring of the quantity of colostrum consumed can be done using a nipple bottle, the calves cannot be force-fed enough colostrum using this method. Thus, force-feeding of calves using an esophageal feeder during the critical time-period immediately after birth may ensure that the calves consume enough colostrum to gain sufficient passive immunity.

Additionally, it has been demonstrated for newborn lambs that the likelihood for disease and death is significantly decreased from force-feeding with colostrum using an esophageal feeder during the first 24 hours of life and it is likely that other animals may benefit in a similar way from early feeding of colostrum.

Use of an esophageal feeder is also a relatively quick process and as it requires only a short period of time on behalf of the operator it is cost effective.

Problems Associated with Current Esophageal Feeders

There are problems associated with the esophageal feeders known to those skilled in the art. It is desirable that while using these types of device, the operator should have both hands free, e.g. as in the case of when using these devices with calves, it is desirable to "minimize the calf being able to move and toss its head . . . (as) . . . this can cause injury". (Frank, R., Dairy Herd Management, October 1997, pub. Vance Publishing Corp.). In addition, farmers may be concerned about "accidentally placing the tube down the trachea", and it is suggested that to solve this problem the operator has "someone else hold the bag of milk. This way you can use both of your hands to feel the tube moving into the esophagus". (Frank, R., Dairy Herd Management, October 1997, pub. Vance Publishing Corp.) However, this is clearly a labour-intensive process and it is clearly desirable and more cost-effective for an operator of an esophageal feeder to work alone. Thus, a feeding device carried by the operator in a way allowing his hands to be free, whilst still allowing the device to be easily accessible, is highly desirable. Such a device must also be easily sanitized, to prevent infection of the young calves.

Certainly, there have been some attempts at meeting some of these needs in animal feeding devices: the large plastic bottle used with some drench gun devices can be strapped to the farmer's back, however this bottle is reusable and so there is a chance of infection of the animal from an inadequately sanitised bottle. Furthermore these types of bottle are too bulky and heavy to transport easily. Flexible plastic bags to contain the colostrum in esophageal feeding devices have also been documented, however not in combination with a "hands-free" method of transportation: at best these inventions incorporate a mechanism for hanging the colostrum bag onto a hook, which is inconvenient to do before the feeder is properly inserted into the esophagus as this then restricts the operator's range of movement.

SUMMARY OF INVENTION

The present invention comprises a device for oral administration of a fluid source, preferably an administration to an individual in need thereof, and methods for use of said device.

In one embodiment of the invention, the device is used to administer colostrum to newborn calves, in order to generate higher levels of passive immunity in the calves than may be gained either from natural suckling or bottle feeding of colostrum.

The fluid or liquid source according to the invention is preferably selected from the group consisting of milk, artificial milk substitutes, and colostrum. Liquid source in the form of colostrum is particularly preferred. The colostrum can be obtained from a domestic animal, including a bovine species.

In one aspect, there is provided a portable, hygienic device for administration of a fluid source to a target, said device comprising (i) a hollow, axially-elongated member comprising a) a distal end comprising a first opening, preferably in the form of a nozzle portion, and b) a proximal end comprising a second opening connected to (ii) a handle comprising a) a distal portion connecting the handle to said axially-elongated member, and b) a proximal portion connecting the handle to (iii) a flexible tube comprising a) a distal end comprising a first opening connected to the handle, and b) a proximal end comprising a second opening connected to (iv) a hollow adaptor capable of attaching the flexible tube to a fluid source container, said adaptor comprising a) a distal end comprising a first opening capable of attaching said distal end of the adaptor to the tubing, and b) a proximal end comprising a second opening capable of bringing the adaptor in contact with the fluid source stored in (v) a container insert, preferably in the form of a disposable, flexible, polymer bag, capable of being closed tight, said container insert being arranged in (vi) a fluid source container fitted to holding said container insert, said fluid source container comprising a) at least one attachment site capable of securing the attachment of the container to the adaptor, and b) means for transporting the device by the operator, (vii) said device further comprising a switch mechanism for regulating the flow of liquid through the axially-elongated member.

The invention also pertains to a container comprising a single, flexible polymer sheet, said polymer sheet comprising a first wall portion, a second wall portion, and a base portion, wherein the first wall portion is permanently fixed to said second wall portion along a single first axis, wherein said first wall portion is permanently fixed to a base portion along a single second axis, wherein said second wall portion is detachably fixed to said first wall portion along a single third axis, and wherein said second axis connects said first and third axes.

In a preferred embodiment of the invention, the container further comprises at least one attachment site capable of securing the attachment of the container to an adaptor, and means for transporting the device by the operator, In an additional aspect of the invention, there is provided a device for administration of a fluid source to an animal, said device comprising (i) a hollow, axially-elongated member comprising a) a distal end comprising a first opening, preferably in the form of a nozzle portion, and b) a proximal end comprising a second opening connected to (ii) a handle comprising a) a distal portion connecting the handle to said axially-elongated member, and b) a proximal portion connecting the handle to (iii) a flexible tube comprising a) a distal end comprising a first opening connected to the handle, and b) a proximal end comprising a second opening connected to (iv) a hollow adaptor capable of attaching the flexible tube to a fluid source container, said adaptor comprising a) a distal end comprising a first opening capable of attaching said distal end of the adaptor to the tubing, and b) a proximal end comprising a second opening capable of bringing the adaptor in contact with the fluid source stored in (v) said device, preferably, comprising a switch mechanism for regulating the flow of liquid through the axially-elongated member.

In other aspects there is provided methods for using said device and/or said container, including a method for oral administration of a fluid or liquid source to an animal, said method comprising the steps of i) providing a fluid or liquid source, ii) providing a device according to the invention, iii) filling said container insert of the device with said fluid or liquid source, and iv) administering said fluid or liquid source to said animal, optionally by operating said switch mechanism.

It is preferred that the liquid source is selected from colostrum, aqueous solutions of nutrients or electrolytes, aqueous solutions of medicaments, and the like.

There is also provided a method for oral administration of colostrum to a bovine species, said method comprising the steps of i) providing a colostrum in liquid form, ii) providing a device according to the invention, iii) filling said container insert of the device with said colostrum, and iv) administering said colostrum to said bovine species, optionally by operating said switch mechanism.

In yet another aspect there is provided a method for confering passive immunity to a new-born domestic animal, said method comprising the steps of i) providing a passive immunity source, such as immunoglobulins, ii) providing a device according to the invention, iii) filling said container insert of the device with said passive immunity source, and iv) administering said passive immunity source to said bovine species, optionally by operating said switch mechanism.

DEFINITIONS

Figure 1:
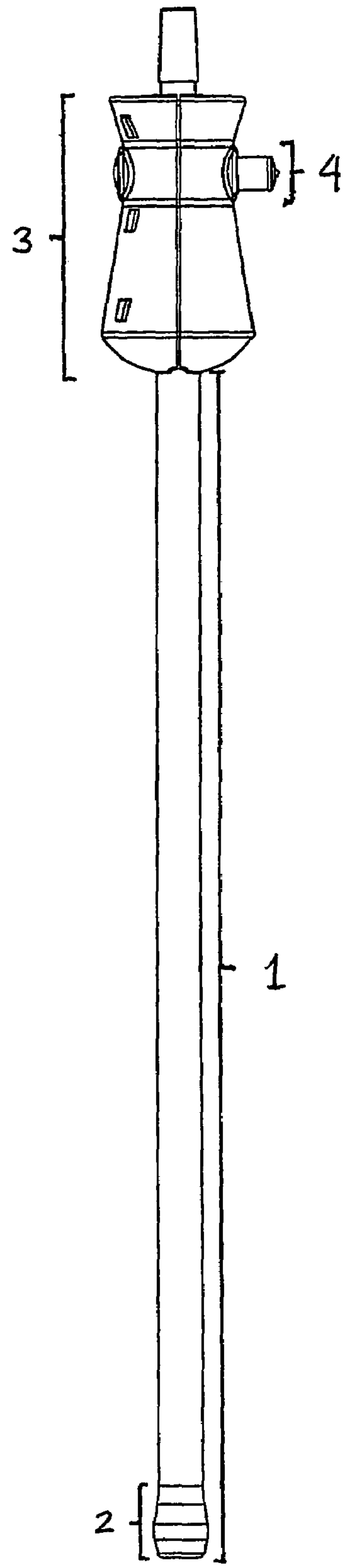
FIG. 1 is a side view of the axially-elongated member (1), the nozzle (2), and the handle (3) preferably comprising a switch mechanism (4).

"essentially inflexible" refers to the fact that that the axially-elongated member can bend, under practical circumstances, less than 5 mm for every 10 cm length of the member.

"some degree of flexibility" refers to the fact that the axially-elongated member can bend, under practical circumstances, more than 5 mm for every 10 cm length of the member. The flexible nature of the member is distributed evenly over the entire length of the member.

"flexible tube" refers to a tube with a high degree of flexibility, i.e. an ability to attain multiple forms such as e.g. coils and other shapes not obtainable by objects having merely some degree of flexibility.

"nozzle" refers to a mouth piece of the axially-elongated member. The nozzle constitutes the distal opening of the member and is preferably of a rounded shape. The nozzle can have more than one opening.

"fluid" describes both fluids and liquids, such as colostrum, water, foods of a fluid or liquid nature and pharmaceuticals provided as fluids or liquids.

"newly born" refers to an animal less than 20 days old, such as 15 days old, such as 10 days old, and such as 5 days old.

"newborn" refers to an animal less than 5 days old, and preferably it relates to an animal within 48 hours of its birth.

"passive immunity" refers to immunity conferred on a subject by transferring immunoglobulins to the subject from a source other than the subject.

DETAILED DESCRIPTION OF THE INVENTION

Axially-Elongated Member

A feature of the present invention is a hollow, axially-elongated member which comprises a distal end comprising a first opening preferably in the form of a nozzle portion, and a proximal end comprising a second opening. In one preferred embodiment of the invention, said hollow axially-elongated member is of a diameter allowing insertion of the axially-elongated member into the esophagus of an individual, such as domestic animal, for example a ruminant, such as a member of a bovine species, for example a cow, such as a calf, for example a calf within, preferably less than 20 days after birth, such as less than 15 days after birth, such as less than 10 days after birth, such as less than 5 days after birth, such as e.g. 24 hours of birth.

Preferable, the invention is to be used on bovine species selected from the group consisting of Holstein and Jersey or other species preferred locally.

The outer diameter of the axially-elongated member, either including or not including the nozzle portion, is preferably less than 20 mm, such as less than 19 mm, for example less than 18 mm, such as less than 17 mm, for example less than 16 mm, such as less than 15 mm, for example less than 14 mm, for example less than 13 mm, such as less 12 mm, for example less than 11 mm, such as less than 10 mm, for example less than 9 mm, such as less than 8 mm.

The diameter of the hollow section (inner diameter) of the elongated member is capable of allowing the flow of a fluid through the elongated member from the opening in the proximal end and out of the opening in the distal end, said diameter of a preferred embodiment being less than 18 mm, such as less than 17 mm, for example less than 16 mm, such as less than 15 mm, for example less than 14 mm, for example less than 13 mm, such as less than 12 mm, for example less than 11 mm, such as less than 10 mm, for example less than 9 mm, such as less than 8 mm, for example less than 7 mm, such as less than 6 mm.

In one preferred embodiment of the invention, the diameter of the nozzle portion preferably prevents the axially-elongated member from being inserted into the trachea of a domestic animal, the diameter of tracheas of all domestic animals being easily obtainable in the prior art by those skilled in the art.

In a preferred embodiment, the domestic animal is a newborn calf, and the diameter of the nozzle at any point along the nozzle is a maximum of about 2 cm. In another preferred embodiment of the invention, the diameter of the nozzle may also be of sufficient size in at least one section of the nozzle to allow the operator of the current invention to use his hand on the outside of an animal's neck to feel the location of the nozzle within the animal, thus enabling the operator to gain an idea of the location of the nozzle within the animal and allowing the operator to more easily insert the nozzle into the esophagus of said animal.

In preferred embodiments of the present invention, the elongated member is preferably manufactured from one or more materials such as, but not restricted to, a plastic such as polyethylene, polypropylene, PVC, and similar polymers suitable for the purpose of the invention.

Figure 4:
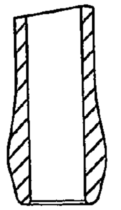
FIG. 4 is a detailed view of a preferred embodiment of the nozzle portion of the axially-elongated member manufactured in such a way that it is integrated in the same piece of material as the axially-elongated member.
Figure 5:
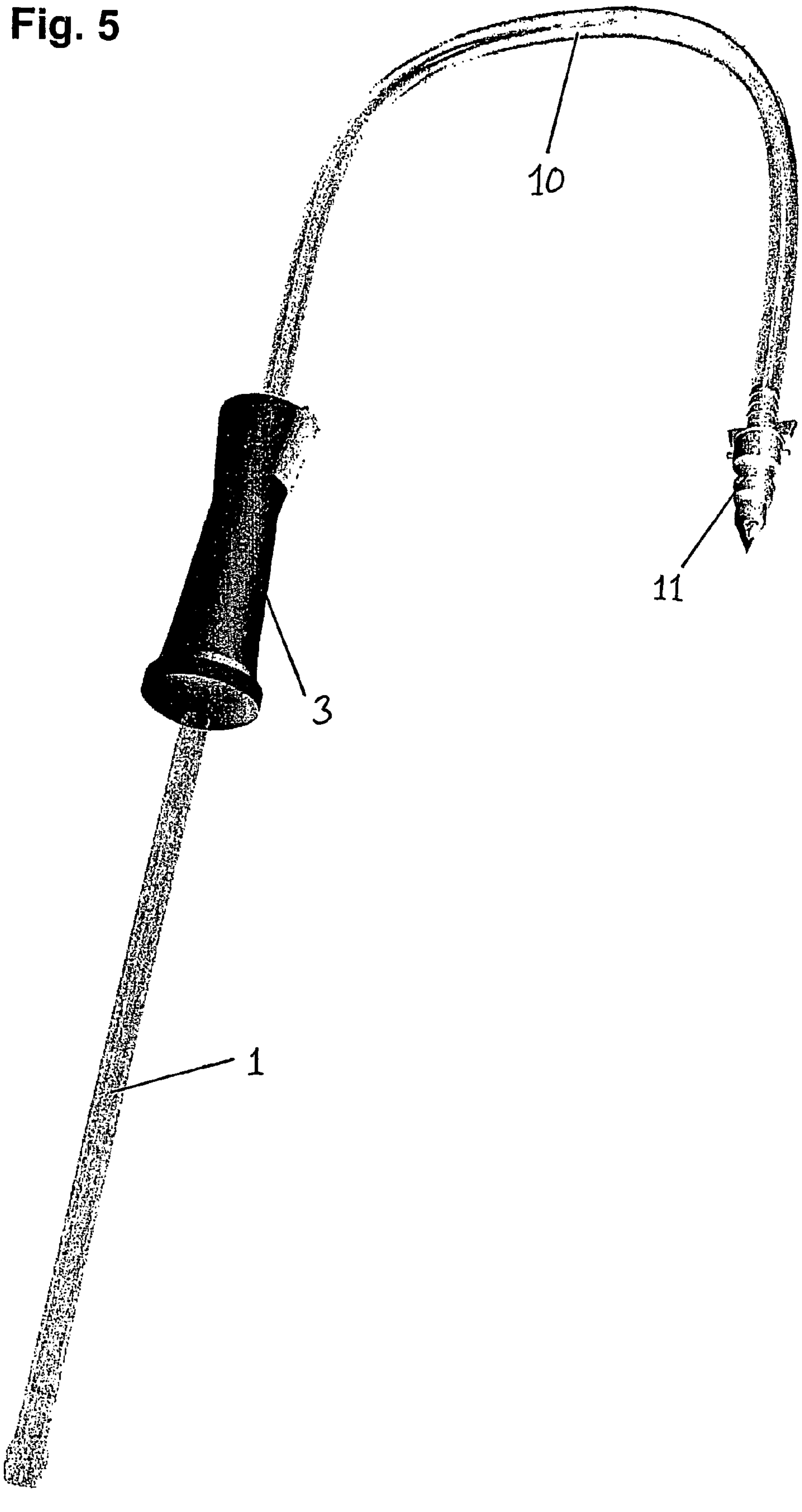
FIG. 5 is a detailed view of one preferred embodiment of the axially-elongated member (1), the handle (3), the flexible tube (10), and the adaptor (11).
Figure 6A:
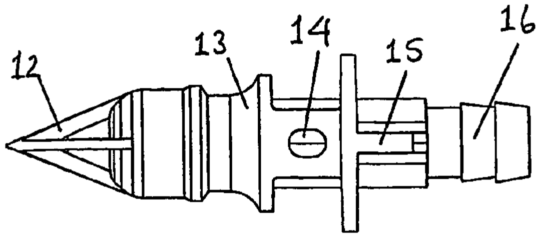
FIG. 6 shows detailed diagrammatical representations of two side views (FIG. 6A and 6B), a 3D view (FIG. 6C), a proximal end view (FIG. 6D), and a distal end view (FIG. 6E) of one preferred embodiment of the adaptor, showing the tapering end (12), a shoulder (13) for ensuring a tight connection between the adaptor and a container insert, the locking pins (14), the planar flanges (15), and means for attaching (16) the adaptor to the tubing.
Figure 6D:
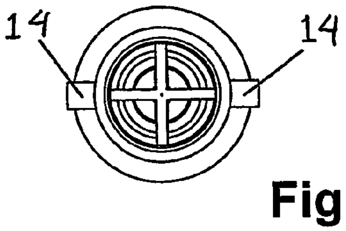
Figure 6E:
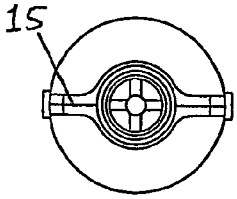
Figure 6B:
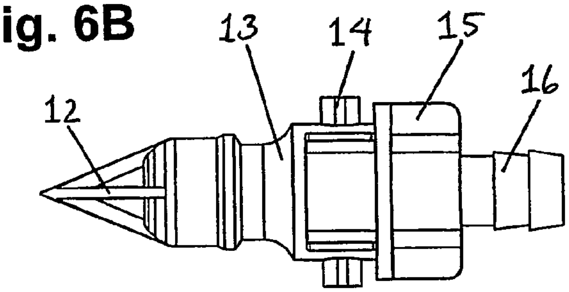
Figure 6C:
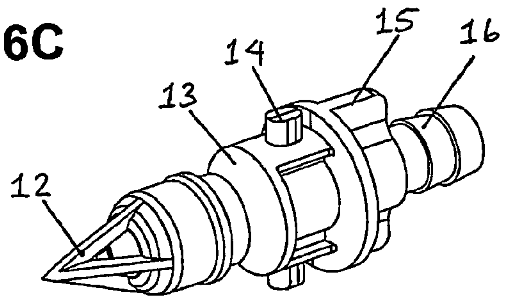

According to one embodiment of the present invention, the nozzle of said elongated member is not of uniform diameter but is of a shape allowing ease of insertion into an animal's esophagus. In this case, the animal is preferably a domestic animal, more preferably a ruminant, even more preferably a member of a bovine species, more preferably a cow, more preferably a calf, more preferably a calf within 24 hours of birth. One or more parts of the shape or the nozzle are preferably of larger diameter than the remaining sections of the axially-elongated member. The shape is preferably rounded, or tear-shaped so as to prevent tearing of the inner esophagus of the animal and ease the insertion of the axially-elongated member; an example of one preferred shape is illustrated in FIG. 4.

In particularly preferred embodiments, the present invention provides a device, wherein the axially-elongated member comprising the nozzle portion is capable of being inserted into the esophagus of a domestic animal, and wherein the nozzle portion preferably prevents the axially-elongated member from being inserted into the trachea of the domestic animal. For this purpose, the nozzle is preferably rounded or tear-shaped and has an outer diameter larger than the outer diameter of the rest of the axially-elongated member.

In other preferred embodiments of the invention, the axially-elongated member and the nozzle portion is manufactured from a single piece of material, for example by injection moulding, to prevent the nozzle portion from detaching from the axially-elongated member when the device is being used.

The axially-elongated member can have at least some degree of flexibility. However, the axially-elongated member can also be rigid and essentially inflexible so as to prevent the animal from breaking the member. A hardened polymer is suitable for such embodiments, including e.g. a thermoplastic polymer and polymers such as polypropylene, polyethylene, polyvinylchloride, and the like. Such polymer materials can be subjected to e.g. hot or boiling water for cleaning purposes.

Preferably, the length of the axially-elongated member from the tip of the nozzle portion to the distal portion of the handle is adapted to the anatomy of the animal, preferably in a way so as not to reach regions of the esophagus adjacent to the heart of the animal where it might cause irritation. In preferred embodiments of the invention, said animal may be any animal of the group of hoofed or cloven-footed animals, such as for example cow, sheep, goat, and horse. In a particular preferred embodiment, the animal is a bovine species.

The length of the axially-elongated member is preferably from 20 to 40 cm, such as from 25 to 35 cm, for example from 30 cm to 34 cm, such as about 32 cm, and the inner diameter of the axially-elongated member excluding the nozzle portion is preferably from 0.5 cm to 2 cm, such as about 0.8 cm, for example about 1.0 cm, such as about 1.2 cm, for example 1.5 cm, while the outer diameter of the axially-elongated member excluding the nozzle portion is from 0.2 cm to about 1 cm larger than the inner diameter of the rest of the axially-elongated member.

Handle

A feature of the present invention is a handle preferably comprising a manually operated switch mechanism, a distal portion connecting the handle to said axially-elongated member, and a proximal portion connecting the handle to a flexible tubing. The handle is preferably of a length and diameter allowing it to be held and easily operated by a human hand while with the same hand supporting the jaw of the animal; the length of the handle being preferably 5-30 cm long, more preferably less than 20 cm long, more preferably less than 15 cm long, such as 14, 13, 12, 11, 10, 9, 8, 7, 6, or 5 cm long.

In particularly preferred embodiments, the handle is of a diameter preventing it from easily entering the mouth of the animal thereby preventing the axially-elongated member of the device from reaching regions of the esophagus of the animal adjacent to the heart; the diameter of the handle being preferably 3 to 8 cm, such as 7, 6, 5, or 4 cm.

Figure 2:
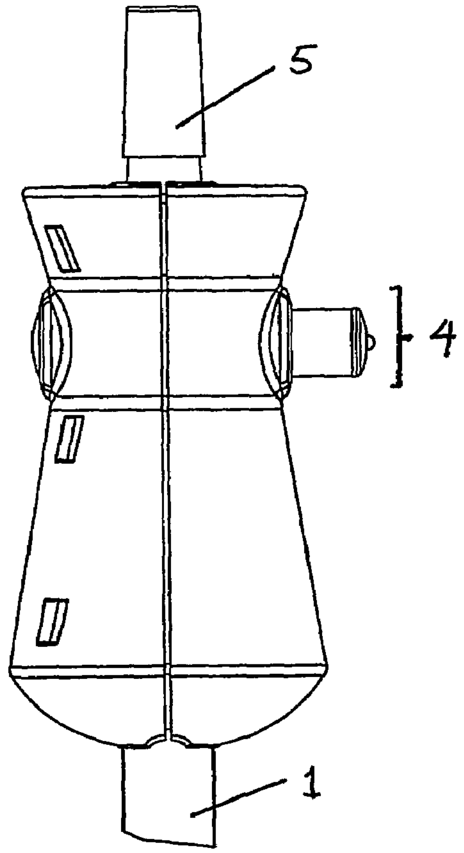
FIG. 2 is a detailed side view of one preferred embodiment of the handle, showing the switch mechanism (4), the connecting axially-elongated member (1), and means for connecting the handle to the flexible tubing (5). In one preferred embodiment of the invention, the means for connecting the handle to the flexible tubing comprises a hollow member, preferably with a threaded outer surface, with a diameter slightly smaller than the inner diameter of the flexible tubing.

A preferred embodiment of the handle is illustrated in FIG. 2.

In preferred embodiments of the present invention, the handle, including or not including the switch, is preferably manufactured from one or more materials such as, but not restricted to, plastics such as polyethylene or the like, metal, rubber and/or wood.

The switch mechanism, preferably built into the handle, is capable of altering the rate of free-flow of the fluid from the elongated member to the flexible tube. Preferably, the switch mechanism is positioned on the handle in such a way that the operator can hold the handle and at the same time operate the switch with one hand.

Figure 3A:
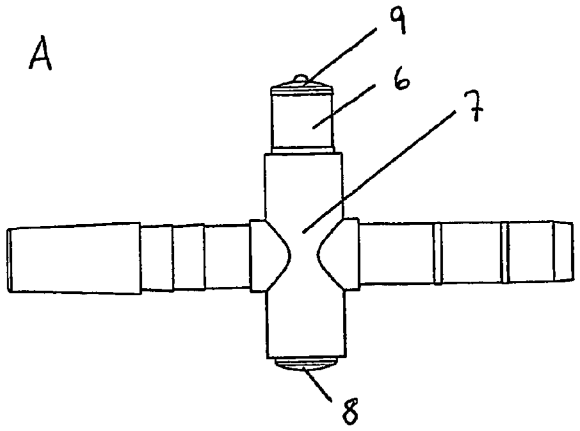
FIG. 3 shows a detailed diagrammatical representation (FIG. 3A) and an exploded drawing showing the various components in detail (FIG. 3B) of one preferred embodiment of the switch mechanism comprising a sliding valve, showing the pawl (6), the hollow part of the handle (7) with means for receiving the pawl, and projections on the ends of the pawl indicating whether the valve is being opened (8) or closed (9).
Figure 3B:
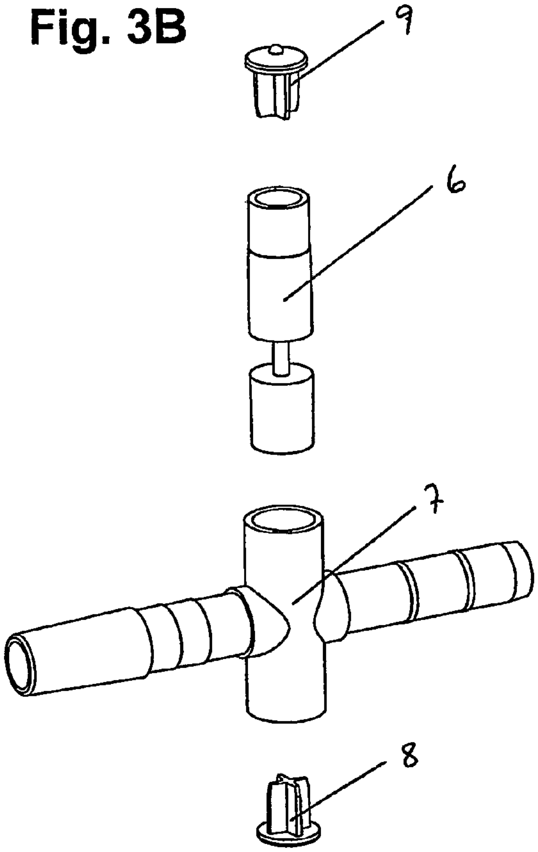

In a preferred embodiment of the invention, the switch mechanism is comprised of a valve, preferably a sliding valve, allowing for ungraduated alteration of the flow rate of fluid. A preferred embodiment of such a sliding valve is illustrated in FIG. 3. In another preferred embodiment of the invention, the switch mechanism allows two or more differing rates of flow of liquid from the elongated member to the flexible tube.

In preferred embodiments of the present invention, the switch is manufactured from one or more materials such as, but not restricted to, plastic such as polyethylene, polypropylene, and the like.

It is much preferred that the switch mechanism for regulating the flow of fluid source through the axially-elongated member is comprised in the handle as this makes the device easier to operate. However, the switch mechanism can also be placed in contact with the flexible tube. The switch mechanism is preferably manually operated, but it can also be an electronic switch operated by an electronic control device preferably forming part of the handle.

Preferably, as one or more audible sounds generated by the switch indicate the rate of flow of liquid, the device can be operated in dark or poorly lit places such as animal houses and stables.

In another preferred embodiment, the switch mechanism is provided with at least one physical feature, such as a knob or a projection, allowing the operator to determine the rate of flow of liquid by the touch of his hand.

Although it is preferred that the handle is hollow, the handle can also be detachably connected to the axially-elongated member. In one embodiment, the device does not comprise a handle, but as an alternative merely a tube adaptor for connecting the flexible tube and the axially-elongated member. In another embodiment, the handle is manufactured as two or more pieces that, when put together, comprise a hollow handle.

Flexible Tube

A feature of the present invention is a flexible tube comprising a distal end comprising a first opening connected to the handle, and a proximal end comprising a second opening. The diameter of the hollow section of the tube is capable of allowing the flow of a fluid through the tube from the opening in the proximal end and out of the opening in the distal end, said diameter in a preferred embodiment is less than 2 cm.

In preferred embodiments of the present invention, the flexible tube is manufactured from one or more materials such as, but not restricted to, flexible plastics such as PVC, polyethylene, and polypropylene. In one preferred embodiment, the axially-elongated member is less flexible than the flexible tube.

Adaptor

A feature of the present invention is a hollow adaptor capable of connecting the flexible tube to a fluid source, said adaptor comprising a distal end comprising a first opening capable of securing the attachment of the adaptor to the tubing, and a proximal end bringing the adaptor in contact with the fluid source. In one preferred embodiment of the present invention, at least part of the adaptor comprises a tapering part. Preferably the proximal end of the adaptor is pointed.

In a much preferred embodiment of the invention, the tapering end of the adaptor is capable of penetrating said container insert when it is filled with the liquid source. In a preferred embodiment, the adaptor further comprises means for providing a tight sealing between the adaptor and the filled container insert when the adaptor is in contact with the fluid source within the container insert. For example, such sealing means can comprise a shoulder (referred to as 13 in FIG. 6) positioned distal to the tapering end allowing the filled container insert, by the weight of the fluid inside, to seal around the cylindrical part of the shoulder. In addition, the surface of the adaptor may be provided with a mirror finish allowing the filled container insert to seal more tightly to the adaptor.

It is much preferred that the adaptor further comprises a locking portion preferably comprising a plurality of locking pins (referred to as 14 in FIG. 6), such as two locking pins, or more than two locking pins, for securing the attachment of the adaptor to said fluid source container. The adaptor can also comprise two or more oppositely located planar flanges (referred to as 15 in FIG. 6) for rotating the adaptor into locking position once it has made contact with the fluid source container.

Figure 7:
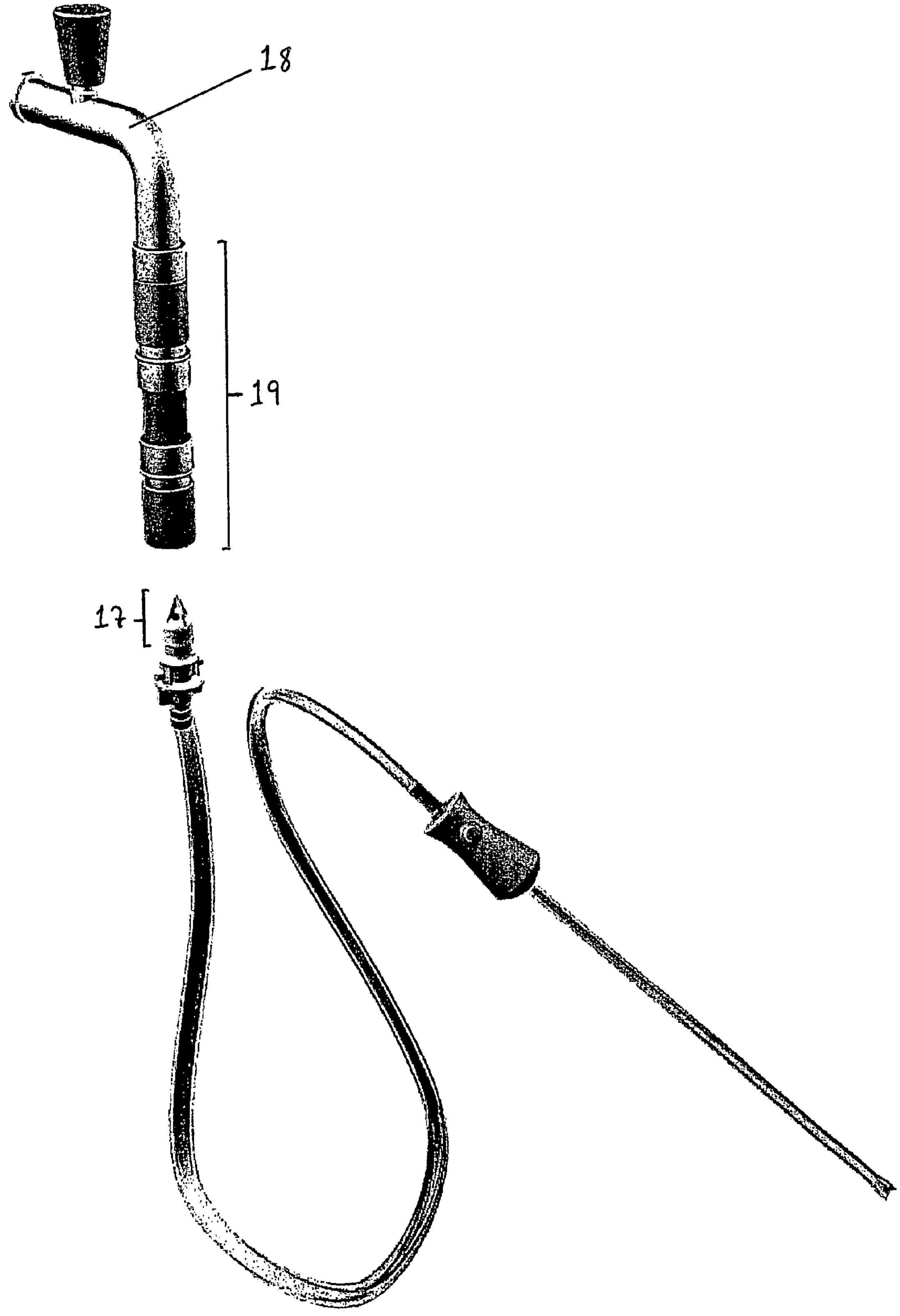
FIG. 7 is a 3D view of a set-up for cleaning the present invention: the adaptor preferably comprises a portion (17) capable of being connected to a water tap (18) via a hosepipe adaptor (19).
Figure 8A:
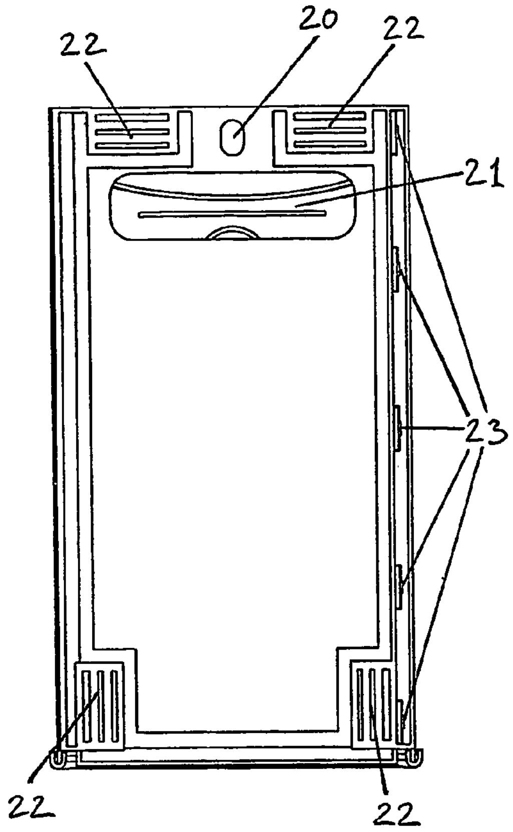
FIG. 8 shows detailed diagrammatical representations of a back view (FIG. 8A), a side view (FIG. 8B), a front view (FIG. 8C), and a bottom view (FIG. 8D) of one preferred embodiment of the empty container, showing a hole for attaching the container to the wall (20), a handle for transporting the container (21), holes in the back for insertion of carrying straps (22), attachment means, such as snap locks for assembling the container from one flat sheet of material (23), an attachment site (24) for the adaptor, and front holes (25) enabling the operator to easily view the amount of liquid in the container insert and for allowing easy bending of the container into the desired shape. Preferably, the container has bottom holes (26) for allowing liquid from spill over or from cleaning to easily exit the container.
Figure 8B:
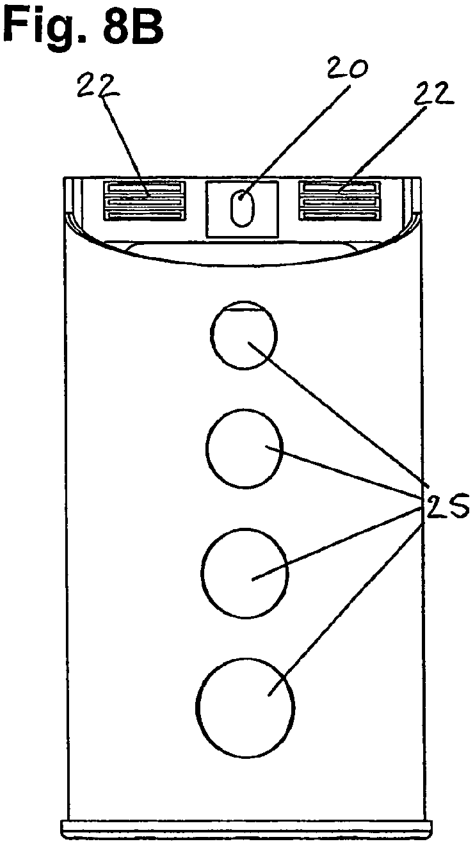
Figure 8C:
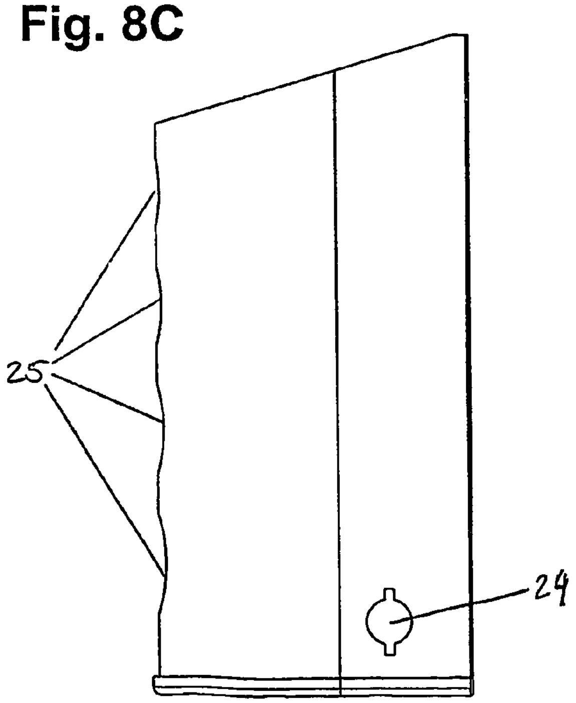
Figure 8D:
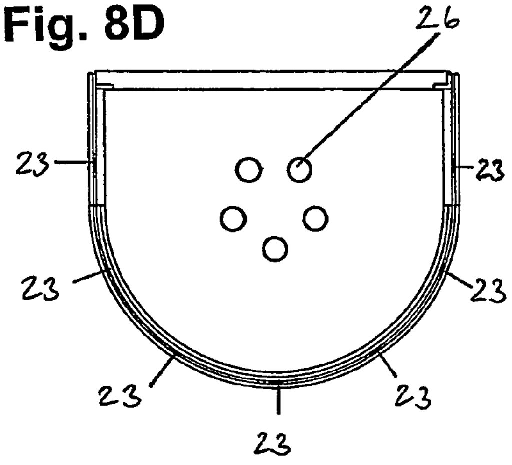

In order to ensure a proper cleaning of the assembled device after use, the adaptor can further comprise a portion for detachably connecting the adaptor to a cleaning device, as shown in FIG. 7. The cleaning device can be a water tap optionally fitted with a hosepipe adaptor capable of detachably connecting the water tap to the adaptor of the device. In this way it is possible to flush through the system with water or aqueous liquid optionally comprising a cleaning agent.

In preferred embodiments of the present invention, the adaptor is preferably manufactured from one or more materials such as, but not restricted to, plastics such as but not restricted to, polyethylene, polypropylene and/or metals such as, but not restricted to, stainless steel.

Container

Another feature of the present invention is a container capable of holding a volume of fluid or liquid for administration of said fluid or liquid to an animal. In a preferred embodiment of the invention, said container is portable and preferably capable of being transported by a single operator of the device.

For securing the attachment of the adaptor to the container, the container preferably comprise at least one attachment site for the adaptor. In a preferred embodiment of the invention, the container on the inside comprises a mechanism, such as barbs, surrounding said attachment sites for securing said locking pins of the adaptor.

To allow ease of transport, the container preferably comprises one or more means for transporting, such as a handle or such as one or more straps. In a preferred embodiment, these means of transporting enable the container to be transported on the back of an operator. In preferred embodiments of the invention, the means for transporting comprise one or more straps. In preferred embodiments of the present invention, the straps are preferably manufactured from one or more materials such as, but not restricted to, rubber, leather and/or artificial materials.

In one preferred embodiment of the invention, the container is collapsible, allowing ease of packaging, transport and storage of the container; even more preferably the container comprises a single sheet of material, preferably a polymer material, capable of folding into a container.

The sheet preferably comprises a first wall portion, a second wall portion, and a base portion, wherein the first wall portion is permanently fixed to said second wall portion along a single first axis, wherein said first wall portion is permanently fixed to a base portion along a single second axis, wherein said second wall portion is detachably fixed to said first wall portion along a single third axis by attachment means, such as one or more snap locks, and wherein said second axis connects said first and third axes.

Figure 11:
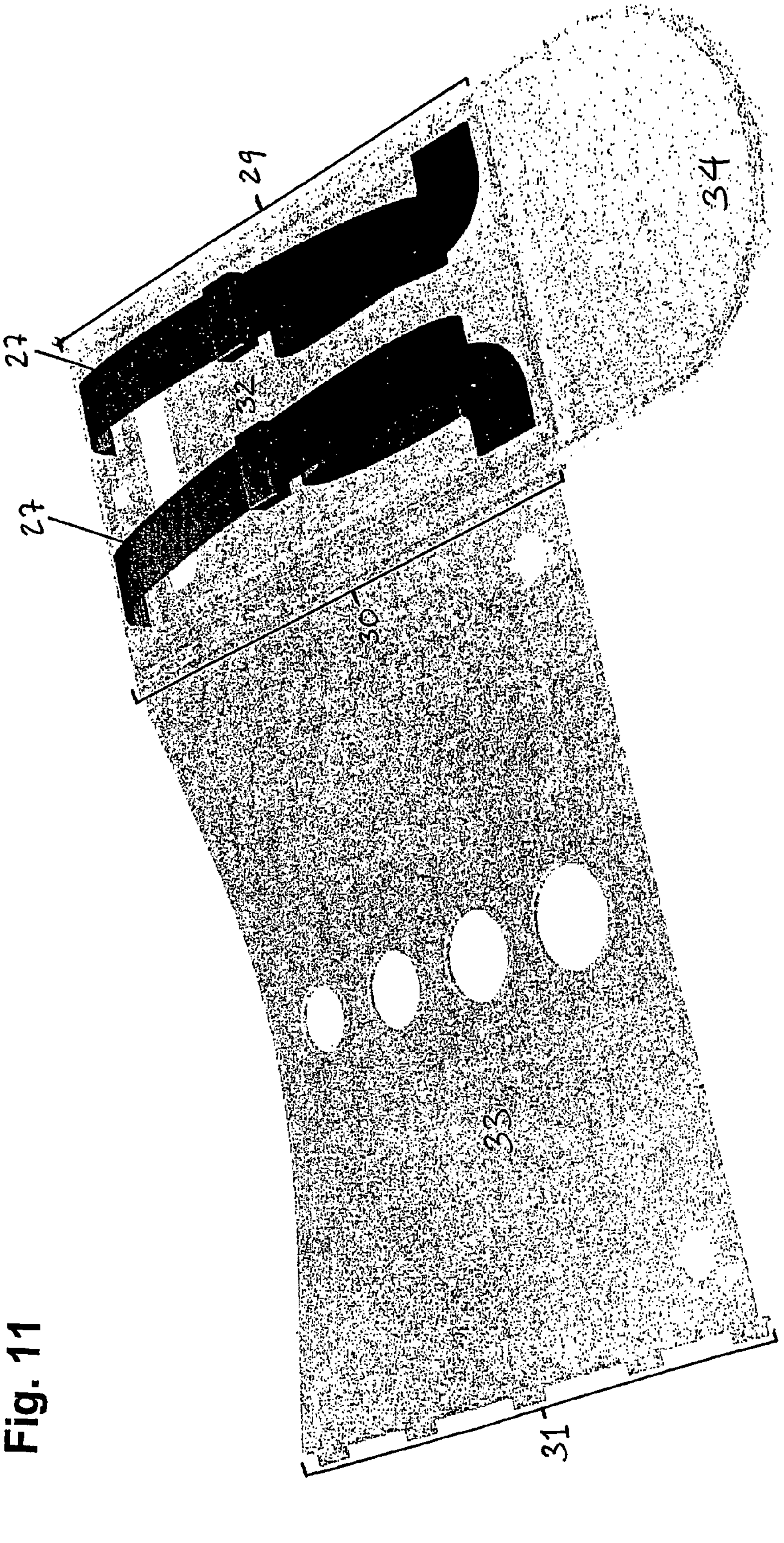
FIG. 11 is a 3D view of the collapsible container with straps (27), showing how it may be made from a flat sheet of material allowing it to be easily stored and transported. The first (29), second (30) and third (31) axes are marked as are the first wall (32), second wall (33), and base section (34).
Figure 12:
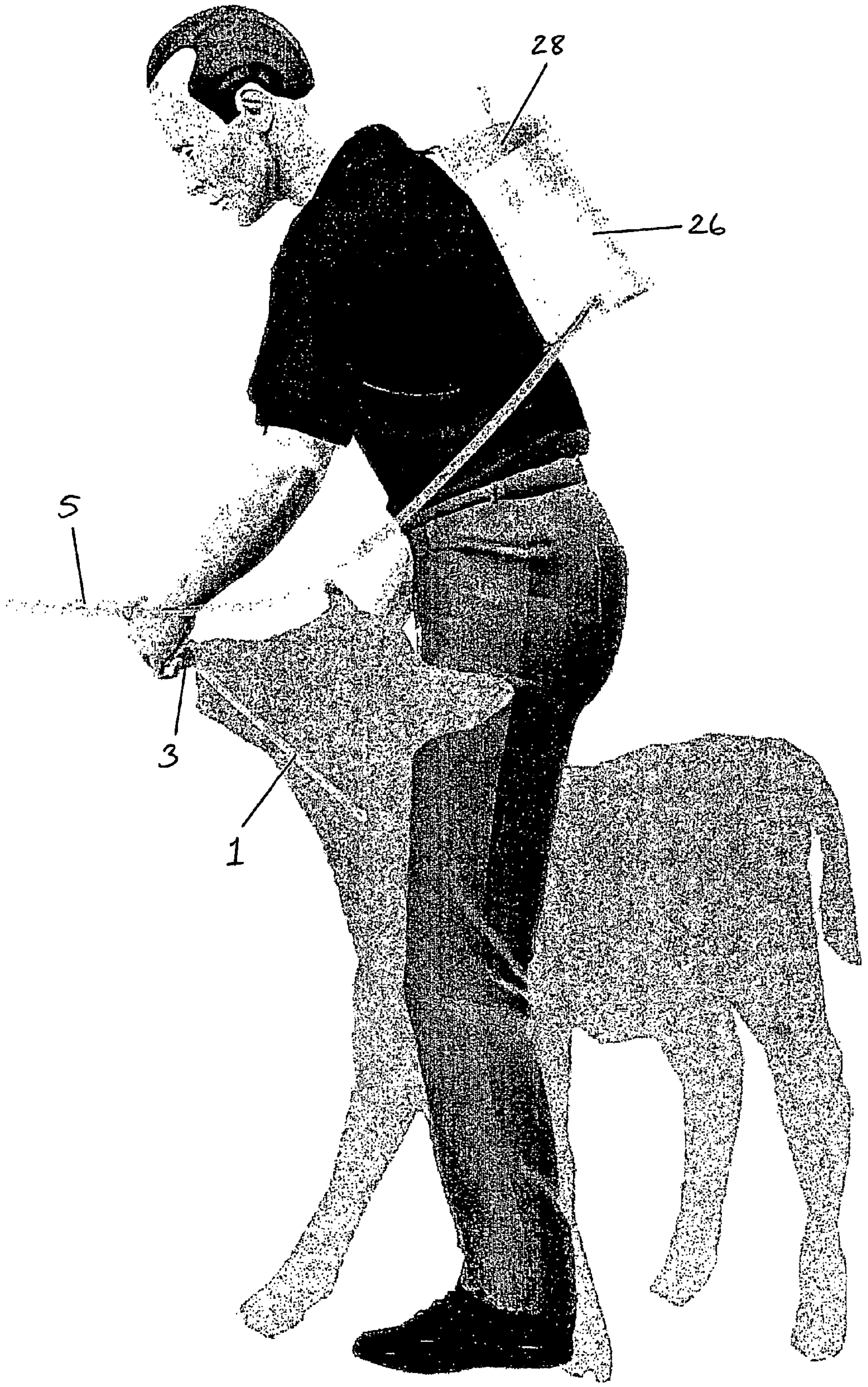
FIG. 12 is a 3D view of the device being used by an operator for administrating liquid to a calf, showing the axially-elongated member (1), the handle (3), the flexible tubing (5), and the container (26) with container insert (28).

This is illustrated in FIG. 11.

The container may be an open container with no top or lid to ease the access of the container insert into the container or it may be closed with for example a lid or a top.

In a preferred embodiment of the present invention, the container comprises a cut in or a hook for securing the elongated member when the device is not in use. The cut in is preferably located in the top part of the second wall portion. This is illustrated in FIG. 8.

In another preferred embodiment of the invention, the container comprises holes for easily determining the present level of fluid source.

In preferred embodiments of the present invention, the container is preferably manufactured from one or more materials such as, but not restricted to, plastics, preferably polyethylene or polypropylene, and/or metals, preferably but not restricted to stainless steel.

Figure 9B:
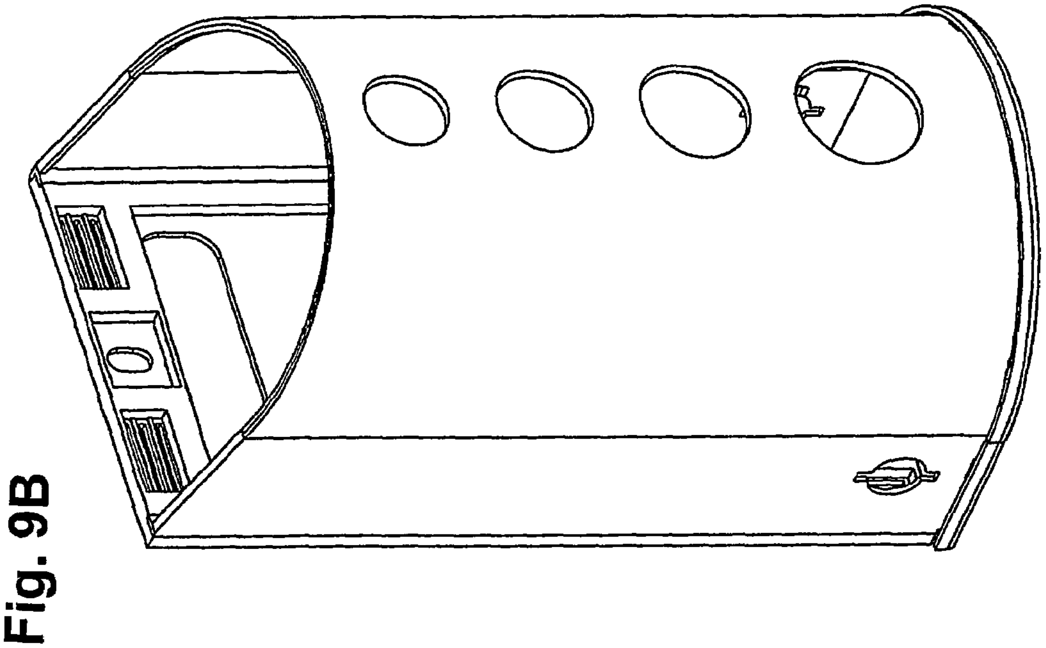
FIG. 9 is 3D views of the back (FIG. 9A) and front (FIG. 9B) of the empty container.
Figure 9A:
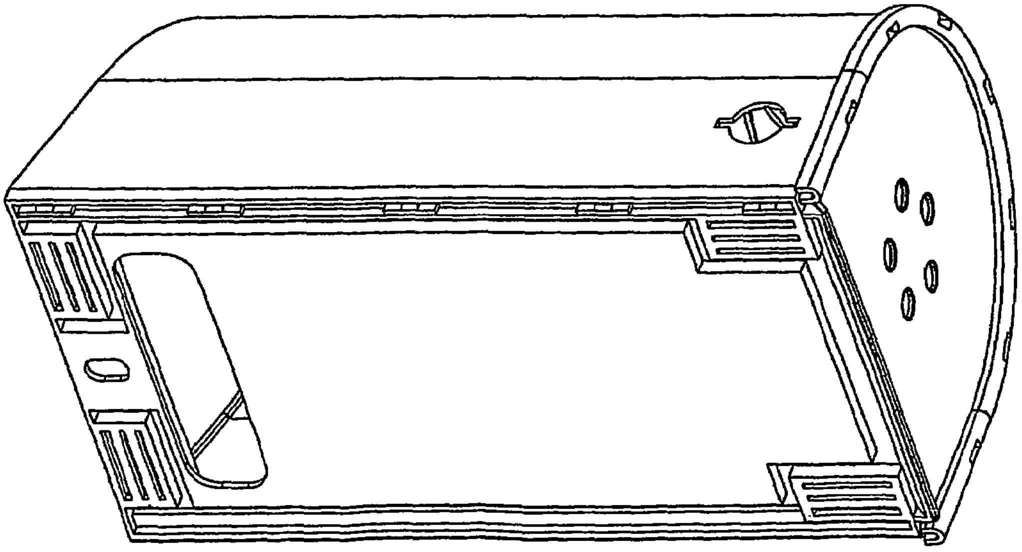
Figure 10:
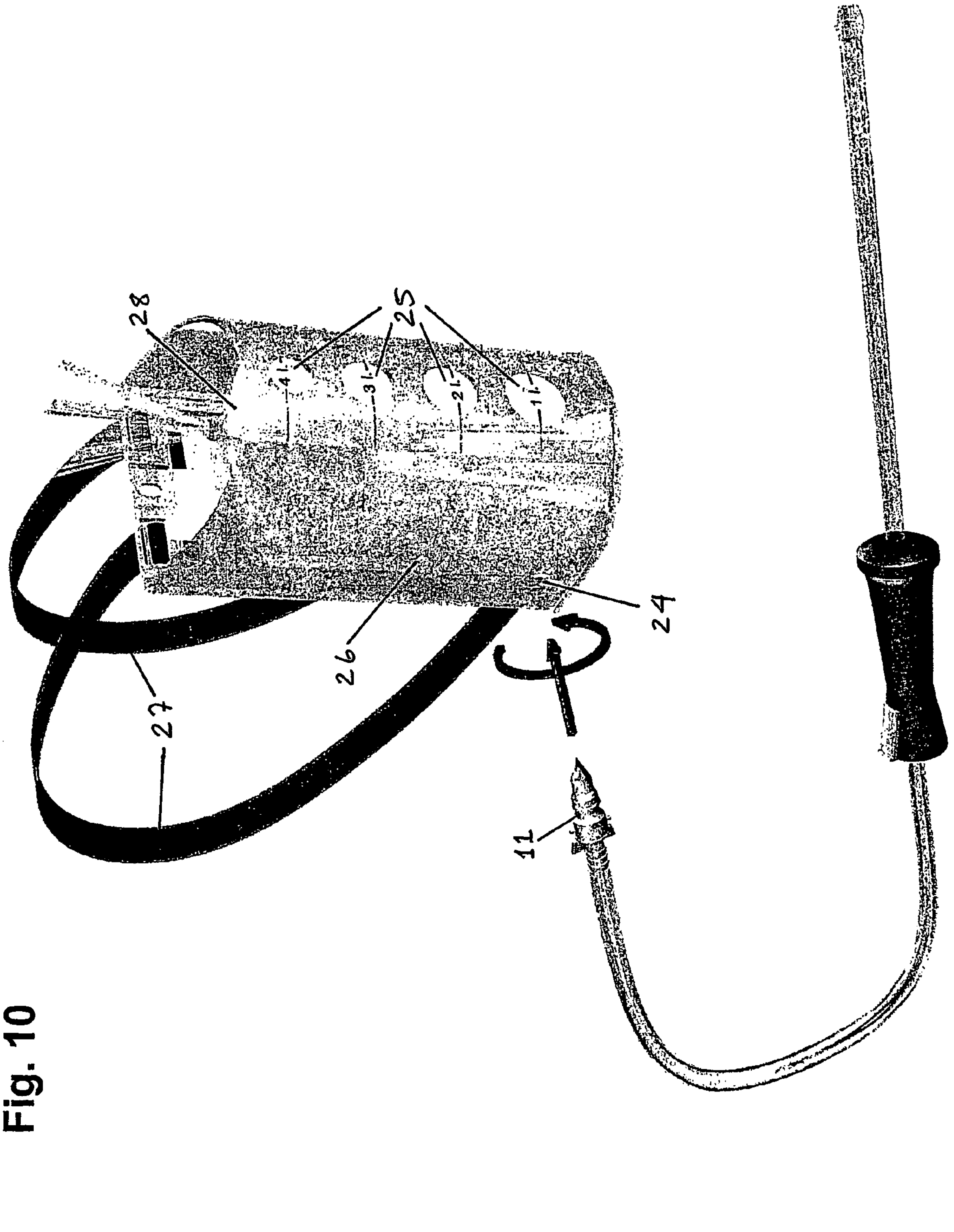
FIG. 10 is a 3D view of the container (26) with straps (27) enabling the container to be carried on the operator's back, the fluid source stored in a closed container insert (28), and front holes (25) for viewing the amount of liquid in the container insert. The view also shows how the adaptor (11) can be connected to the container at the attachment site (24) thereby penetrating the container insert and bringing the adaptor in contact with the liquid source inside the container insert.

The shape of the container may be any design allowing efficient transport of the fluid, for example the container may be cylindrical or in the shape of a cuboid. One preferred shape of the container is illustrated in FIGS. 8-10.

Container Insert

In one preferred embodiment of the invention, the fluid to be administered to the individual is contained within a container insert in the form of a polymer bag, which is preferably disposable, allowing hygienic transport of the fluid. The bag is preferably marked clearly with printed markers, allowing the user to estimate how much fluid is contained within the bag, for example these markers in one embodiment mark the level reached by fluid in the bag in intervals of 1 litre, for example up to 10 litres, more preferably less than 9 litres, for example 8 litres, such as 7 litres, for example 6 litres, such as 5 litres, for example in intervals of 1,2,3 and 4 litres of fluid, or alternatively in intervals of smaller than a litre, for example the markers may read 0.5, 1, 1.5, 2, 2.5., 3, 3.5 and 4 litres.

In one preferred embodiment of the invention, the container insert is capable of containing less than 10 litres of fluid, such as less than 9 litres of fluid, for example less than 8 litres of fluid, such as less than 7 litres of fluid, for example less than 6 litres of fluid, such as less than 5 litres of fluid, for example less than 4 litres of fluid, such as less than 3 litres of fluid, for example less than 2 litres of fluid.

Preferably, the container insert should have dimensions which allows it to be closed after filling it with the liquid source with minimal air inside. The closing of the container insert could be performed by using suitable means, for example by tying a knot on the container insert, or by using a clamp or a tie-string.

In preferred embodiments of the present invention, the container insert is preferably manufactured from one or more materials such as, but not restricted to, plastics such as polyethylene and/or PVC, laminated paper or materials known to those skilled in the art to have similar properties.

Individuals in need of administration of fluid from this device are preferably domestic animals, such as ruminants, preferably bovine species, more preferably species of cow, more preferably calves, more preferably newborn calves, more preferably newborn calves within 24 hours of birth.

Fluids which may be administered include, but are not restricted to, water, fluid or liquid foods, colostrum, artificial food supplements, as well as fluid or liquid medicaments.

In one preferred embodiment, the invention is used to administer colostrum to newborn calves, in order to generate higher levels of passive immunity in the calves than may be gained either from natural suckling, bottle feeding of colostrum or feeding of colostrum substitutes.

The invention claimed is:

1. A portable device for oral administration of a fluid source to an animal, said device comprising i) a hollow, axially-elongated member comprising
  a) a distal end comprising a first opening, preferably in the form of a nozzle portion, and
  b) a proximal end comprising a second opening connected to
ii) a handle comprising
  a) a distal portion connecting the handle to said axially-elongated member, and
  b) a proximal portion connecting the handle to
iii) a flexible tube comprising
  a) a distal end comprising a first opening connected to the handle, and
  b) a proximal end comprising a second opening connected to
iv) a hollow adaptor capable of attaching the flexible tube to a fluid source container, said adaptor comprising
  a) a distal end comprising a first opening, said distal end capable of securing attachment of said adaptor to the tubing, and
  b) a proximal end comprising a second opening, said proximal end a tapering end capable of bringing the adaptor in contact with the fluid source container
v) said device further comprising a switch mechanism for regulating the flow of liquid through the axially-elongated member, wherein the fluid source of the device is stored in a container insert in the form of a disposable, flexible polymer bag, said container insert being arranged in the fluid source container fitted to holding said container insert, said fluid source container comprising
  a) at least one attachment site capable of securing the attachment of the container to the adaptor, and
  b) means for transporting the device by the operator.

2. The device according to claim 1, wherein the nozzle portion is of a shape and size which preferably inhibits the axially-elongated member from being inserted into the trachea of the domestic animal.

3. The device according to claim 1 wherein the axially-elongated member comprises or consists of a polymer.

4. The device according to claim 1, wherein the length of the axially-elongated member from the tip of the nozzle portion to the distal portion of the handle is from 30 cm to 34 cm, such as about 32 cm.

5. The device according to claim 1, wherein the switch mechanism for regulating the flow of fluid source through the axially-elongated member is comprised in the handle.

6. The device according to claim 1, wherein the switch mechanism comprises a valve.

7. The device according to claim 1, wherein the switch mechanism comprises a sliding valve.

8. The device according to claim 1, wherein the handle is hollow.

9. The device according to claim 1, wherein the handle consists of at least two detachable parts.

10. The device according to claim 1, wherein said adaptor further comprises a shoulder distal to said tapering end for providing a tight connection between the adaptor and said container insert.

11. The device according to claim 1, wherein said adaptor further comprises a plurality of locking pins for securing the attachment of the adaptor to said fluid source container.

12. The device according to claim 1, wherein said adaptor further comprises a portion for detachably connecting the adaptor to a cleaning device.

13. The device according to claim 1, wherein the container comprises a single polymer sheet capable of folding into a container, said polymer sheet comprising a first wall portion, a second wall portion, and a base portion wherein the first wall portion is permanently fixed to said second wall portion along a single first axis, wherein said first wall portion is permanently fixed to a base portion along a single second axis, wherein said second wall portion is detachably fixed to said first wall portion along a single third axis, and wherein said second axis connects said first and third axes.

14. The device according to claim 1, wherein said container is capable of being unfolded into an essentially planar sheet when not in use.

15. A method for oral administration of a fluid or liquid source to an animal, said method comprising the steps of i) providing a fluid or liquid source, ii) providing a device according to claim 1, iii) filling said container insert of the device with said fluid or liquid source, and iv) administering said fluid or liquid source to said animal, optionally by operating said switch mechanism.

16. The method according to claim 15, wherein the liquid source is selected from the group consisting of colostrum, aqueous solutions of nutrients or electrolytes, and aqueous solutions of medicaments.

17. The method according to claim 16, wherein the liquid source is colostrum.

18. The method of claim 15, wherein the device used is according to claim 1, and wherein the size of the nozzle allows the operator of the device to determine the present position of the nozzle in the esophagus from the outside of the animal by pressing said nozzle portion against the inside wall of the esophagus.

19. A method for conferring passive immunity to a newly born domestic animal, said method comprising the steps of i) providing a passive immunity source, ii) providing a device according to claim 1, iii) filling said container insert of the device with said passive immunity source, and iv) administering said passive immunity source to said bovine species, optionally by operating said switch mechanism.

* * * * *